(12) United States Patent
Nosack et al.

(10) Patent No.: US 7,643,835 B1
(45) Date of Patent: Jan. 5, 2010

(54) SYSTEM AND METHOD FOR DETERMINING A NEAREST NETWORK RESOURCE USING GPS COORDINATES

(75) Inventors: Kurt Nosack, Payson, UT (US); Christopher Jean Seiler, Provo, UT (US); Ty Ellis, Elk Ridge, UT (US)

(73) Assignee: Novell, Inc., Provo, UT (US)

( * ) Notice: Subject to any disclaimer, the term of this patent is extended or adjusted under 35 U.S.C. 154(b) by 468 days.

(21) Appl. No.: 11/108,754

(22) Filed: Apr. 19, 2005

Related U.S. Application Data

(63) Continuation-in-part of application No. 11/030,904, filed on Oct. 10, 2005.

(51) Int. Cl.
*H04W 24/00* (2009.01)

(52) U.S. Cl. .............. 455/456.3; 455/41.3; 455/557

(58) Field of Classification Search ........... 455/41.2, 455/41.3, 66.1, 404.1, 404.2, 414.1, 414.2, 455/418–420, 456.1–457, 517, 550.1, 556.1, 455/556.2, 557, 566; 370/238; 707/3, 10, 707/202, 204
See application file for complete search history.

(56) References Cited

U.S. PATENT DOCUMENTS

| | | | | |
|---|---|---|---|---|
| 5,581,261 | A | 12/1996 | Hickman et al. | 342/385 |
| 6,137,783 | A | 10/2000 | Sallberg | 370/316 |
| 6,208,857 | B1 | 3/2001 | Agre et al. | 455/428 |
| 6,243,039 | B1 * | 6/2001 | Elliot | 342/457 |
| 6,453,237 | B1 | 9/2002 | Fuchs et al. | 701/213 |
| 6,477,581 | B1 | 11/2002 | Carpenter et al. | 709/238 |
| 6,539,232 | B2 * | 3/2003 | Hendrey et al. | 455/456.1 |
| 6,542,748 | B2 * | 4/2003 | Hendrey et al. | 455/456.1 |
| 6,643,704 | B1 | 11/2003 | Timms et al. | 709/239 |
| 6,756,918 | B2 * | 6/2004 | Fomukong | 340/988 |
| 6,897,805 | B2 | 5/2005 | Bajikar | 342/357.06 |
| 6,937,569 | B1 * | 8/2005 | Sarkar et al. | 370/238 |
| 6,968,179 | B1 * | 11/2005 | De Vries | 455/414.1 |
| 7,133,664 | B2 * | 11/2006 | Bahl et al. | 455/414.2 |
| 7,143,171 | B2 | 11/2006 | Eriksson et al. | 709/227 |
| 7,257,411 | B2 * | 8/2007 | Gwon et al. | 455/456.1 |
| 7,336,928 | B2 * | 2/2008 | Paalasmaa et al. | 455/41.2 |
| 2002/0013870 | A1 * | 1/2002 | Aoki et al. | 710/36 |
| 2002/0052751 | A1 * | 5/2002 | Ebata | 705/1 |
| 2002/0058519 | A1 * | 5/2002 | Nagahara | 455/456 |
| 2002/0062263 | A1 * | 5/2002 | Katou | 705/26 |
| 2002/0072855 | A1 | 6/2002 | Fuchs et al. | 701/213 |
| 2002/0077142 | A1 | 6/2002 | Sato et al. | 455/525 |
| 2002/0087522 | A1 | 7/2002 | MacGregor et al. | 707/3 |
| 2005/0124319 | A1 * | 6/2005 | Williams et al. | 455/411 |
| 2005/0180319 | A1 | 8/2005 | Hutnik et al. | 370/229 |
| 2005/0188399 | A1 * | 8/2005 | Tischer | 725/34 |
| 2005/0239477 | A1 * | 10/2005 | Kim et al. | 455/456.1 |
| 2007/0004424 | A1 * | 1/2007 | Sheen et al. | 455/456.1 |
| 2007/0032247 | A1 * | 2/2007 | Shaffer et al. | 455/456.1 |

* cited by examiner

*Primary Examiner*—Patrick N Edouard
*Assistant Examiner*—Anthony S Addy
(74) *Attorney, Agent, or Firm*—Pillsbury Winthrop Shaw Pittman LLP

(57) ABSTRACT

A system and method are provided for determining a nearest network resource using GPS coordinates. A GPS enabled device may obtain its location by requesting its GPS location. A list of network resources storing the desired data may be obtained by the GPS enabled device and the distance between each of the network resources and the GPS enabled device may be calculated. The system then connects to the resource having the shortest distance without requiring a user to know and decide which network resource is closest to their location.

24 Claims, 4 Drawing Sheets

SYSTEM AND METHOD FOR DETERMINING A NEAREST NETWORK RESOURCE USING GPS COORDINATES

CROSS REFERENCE TO RELATED APPLICATIONS

This application is a continuation-in-part of prior U.S. patent application Ser. No. 11/030,904 filed Jan. 10, 2005, entitled, System and Method for Determining a Nearest Network Resource Using GPS Coordinates.

FIELD OF THE INVENTION

The invention relates to determining a nearest network resource using a global positioning system.

BACKGROUND OF THE INVENTION

Mobile computing devices are prevalent today. Users often travel to various locations for business and/or pleasure, and often need to retrieve data from one or more networks. The data is often stored on more than one network resource and the network resources are often located in various geographic locations. Thus, a user wishing to connect to a network must decide which network resource to connect to.

Although several methods exist for determining which network resource to connect to, these methods suffer from a number of drawbacks. For example, some methods calculate the response time for a number of available network resources, employ subnet masks, and/or force users to choose an appropriate network resource from a list. It will be appreciated that the determination of a response time for each network resource in a sophisticated communication network employing numerous network resources can be quite time consuming. Furthermore, forcing the user to choose a network resource can be complicated and possibly confusing to the user. If the user is traveling, for example, to a location in the Midwest, and network resources are available in both the east and the west, the user would have to make a determination of which location is closer.

Other methods and systems include the use of dedicated network elements, such as, for example, redirecting servers, to provide options to the user indicating the most appropriate network resources to connect to. It will be appreciated that the user of such redirecting servers require network integration, ties up network resources, and requires the user device to communicate with the redirecting server in addition to sustaining its communications session with a network resource.

SUMMARY OF THE INVENTION

According to various embodiments of the present invention, a mechanism is provided for determining a nearest network resource by obtaining location information. Many network resources communicate with each other to exchange information. This is particularly prevalent with mobile devices such as laptop computers, wireless/cellular telephones, PDAs, and other mobile devices. The system and method of the present invention enables a nearest network resource to be automatically determined and a connection to be made. The user need not know which particular resource is closest to their present location before making a connection.

The system may include at least some or all of the following components. A location discovery module may be used by a device to determine its location. According to some embodiments of the invention, the device may be a global positioning system (GPS) enabled device. Using a global positioning system, the location discovery module may determine the GPS coordinates of the device. A distance calculation module may be used to determine the distance between the device and one or more available resources. A connections module may be used to manage the connections to the one or more resources.

According to various embodiments of the invention, a user may request to connect a computer device to a network. If the computer device is GPS enabled or can otherwise connect to a GPS satellite, the device may automatically determine the nearest network resource. The user may then be connected to the network without requiring the user to decide which network resource would provide the best connection.

The GPS enabled computer device contacts one or more GPS satellites, as necessary, to determine a location of the device. The computer device also obtains a list of network resources where the needed information may be accessed. The computer device then calculates the distance between its discovered location and each network resource wherein the information may be accessed. The computer device then attempts to connect to the network resource that is the shortest distance from its location. If the computer device is unable to connect to the network resource having the shortest distance, the computer device continues to try other network resources from the list, in the order of shortest distance.

According to some embodiments of the invention, the device may be a wireless device that is not GPS enabled. The wireless device may query its base station to determine the location of the base station and retrieve its GPS coordinates. The system and method of the present invention may determine the nearest network resource that the wireless device may connect to based on the GPS coordinates of the base station associated with the wireless device.

While it is usually optimal to connect to the closest network resource, choosing based on actual distance may not always produce the best connection. This may be due to, for example, the network topology. Thus, according to some embodiments of the invention, the device may use an additional mechanism to determine a response time of a number of network resources having the shortest distance. The device may then choose to connect to the network resource, among those having the shortest actual distance, which also has the fastest response time.

These and other objects, features, and advantages of the invention will be apparent through the following detailed description and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
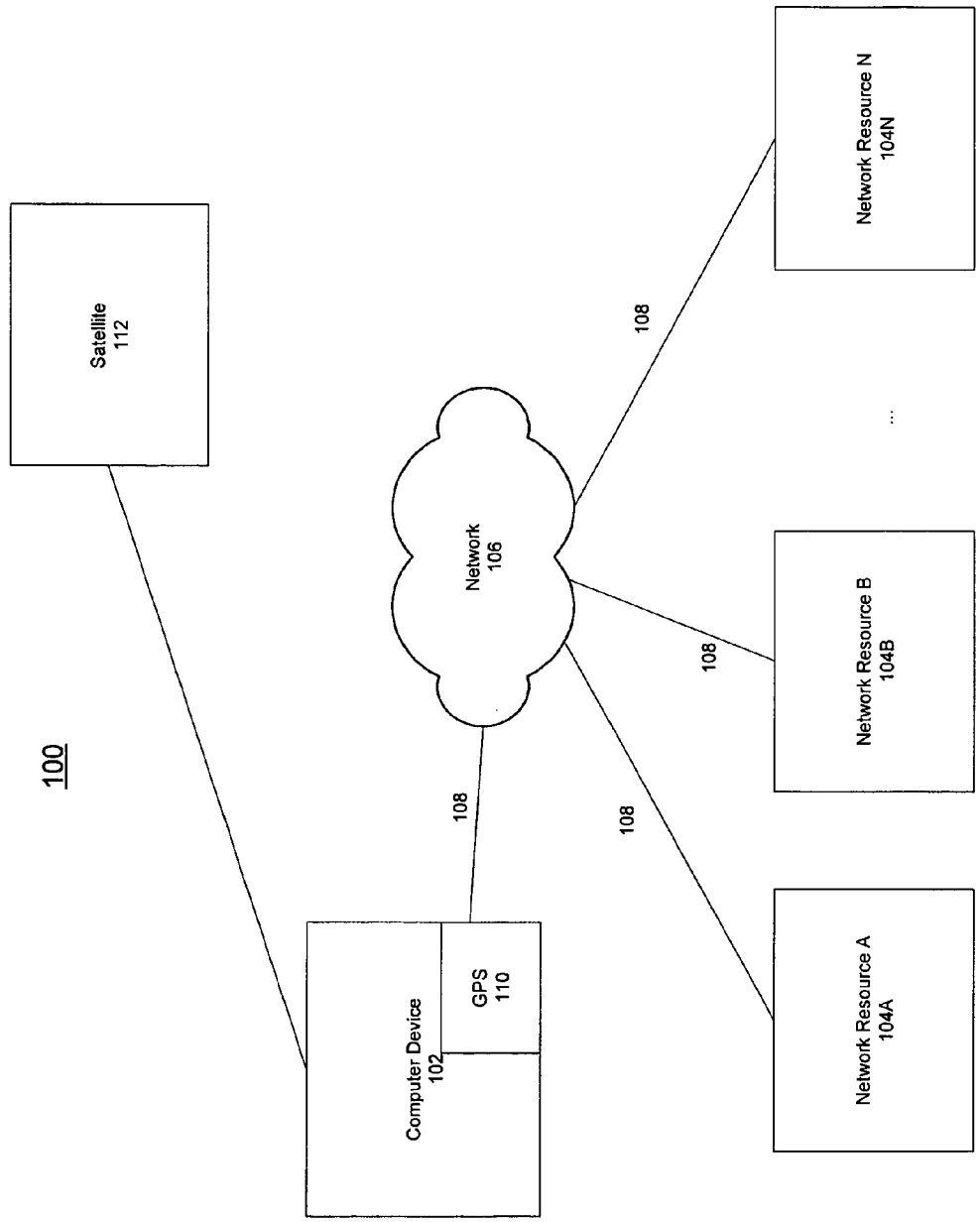
FIG. 1 illustrates an overall system diagram, according to various embodiments of the invention.

FIG. 1 illustrates a system 100, in accordance with various embodiments of the invention. System 100 may comprise a computer device 102, which may include a GPS component 110. Computer device 102 may communicate with one or more GPS satellites 112.

In system 100, a computer device 102 may require access to information stored at one or more resources, such as, for example, network resources 104A-N. Network resources 104A-N may be located in various remote geographic locations. Computer device 102 may communicate with one or more of network resources 104A-N over a network 106 via one or more communications links 108. Network resources 104A-N may be, for example, a server, a computer, a cellular or wireless telephone, a personal digital assistant (PDA), a Blackberry, a printer, a storage device, and/or any resource that is network accessible and has the capability of sending data.

Computer device 102 may be any computer device such as, for example, a laptop computer, a PDA, a Blackberry, an Internet enabled wireless/cellular telephone, and/or any other computer device. Network 106 may include, for example, the Internet, an intranet, a local area network (LAN), and/or other networks. Communications link 108 may include, for example, a DSL connection, an Ethernet connection, and ISDN connection, a wireless connection, and/or other communications links.

To automatically retrieve its location and to automatically connect to the nearest network resource, computer device 102 may include a global positioning device 110. Global positioning device 110 may be integrated with computer device 102, as illustrated in FIG. 1, or may alternatively be a separate device accessible by computer device 102. Global positioning device 110 may communicate with one or more satellites such as satellite 112 to retrieve location information. Global positioning device 110 may be or may interface to any type of global positioning system such as, for example, NAVSTAR GPS, LORAN positioning system, a global paging system, and/or other global positioning systems. As used herein, GPS refers to these and other methods of global positioning.

According to some embodiments of the invention, computer device 102 may be a wireless device. Computer device 102 may communicate with its base station to determine the location and GPS coordinates of the base station. This location may be used to determine a nearest network resource for connecting computer device 102.

Figure 2:
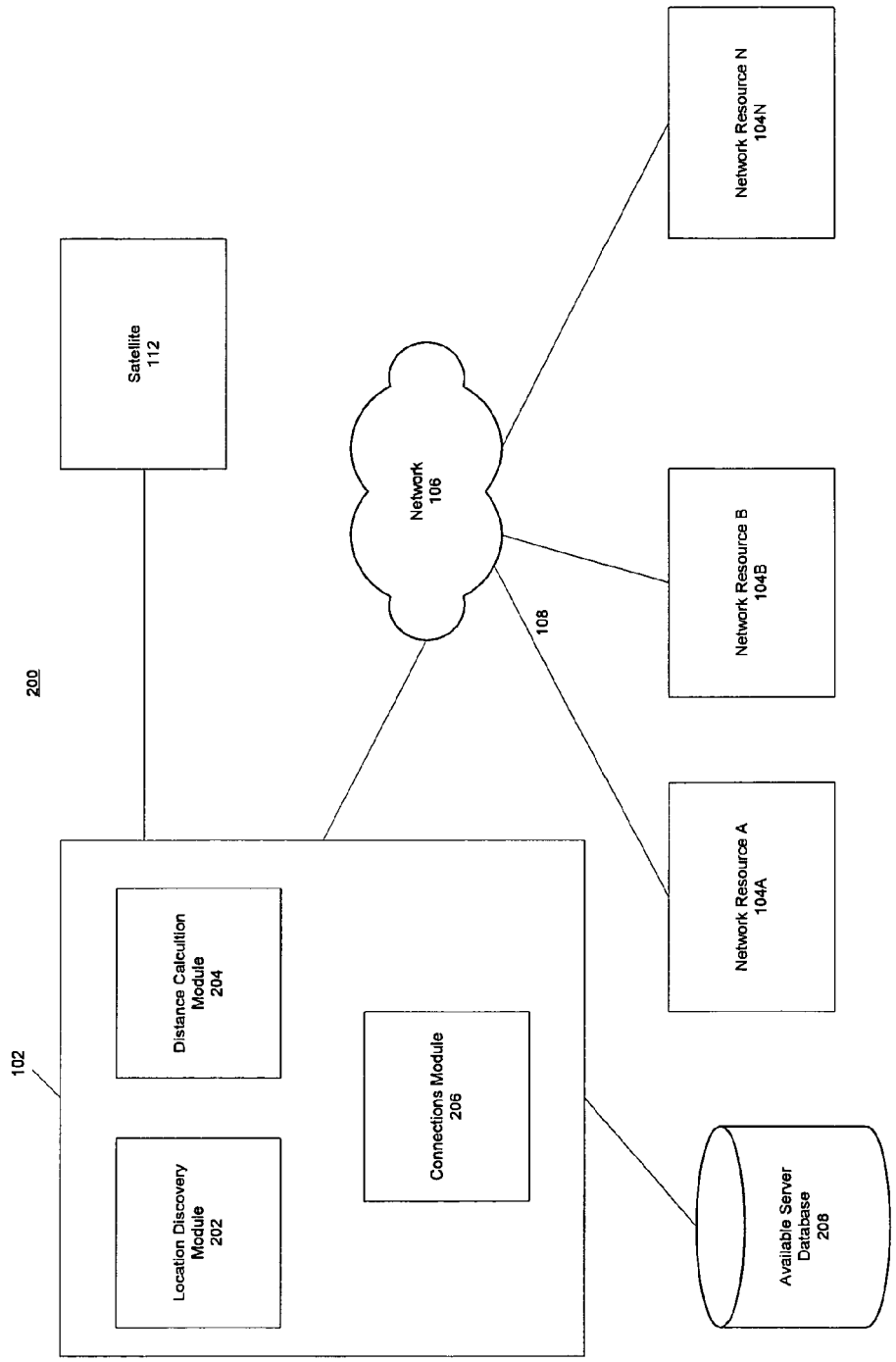
FIG. 2 illustrates a system for detecting a nearest network resource, according to various embodiments of the invention.

FIG. 2 illustrates a system 200 for automatically detecting and connecting to a nearest network resource. As depicted in FIG. 2, computer device 102 may include a plurality of modules for implementing various embodiments of the invention. For example, in some embodiments, a location discovery module 202 may be provided within computer device 102. Location discovery module 202 may be configured to interface with satellite 112 to determine the geographic location of computer device 102. If computer device 102 is a wireless device, location discovery module 202 may enable computer device 102 to query its base station to determine the GPS location of the base station. Since wireless communications travel through the base station, selecting a network resource closest to the base station may often be optimal. A distance calculation module 204 may be provided within computer device 102 that is configured to calculate a distance between computer device 102 and one or more network resources, such as network resources 104A-N.

In addition, a list of network resources storing particular network data may be stored in database 208 communicatively coupled to computer device 102. A connections module 206 may also be provided within computer device 102 that facilitates and manages connections to one or more network resources, such as network resources 104A-N.

Location discovery module 202 may operate by sending a request to retrieve GPS coordinates from satellite 112. In turn, satellite 112 may respond by presenting location discovery module 202 with the GPS coordinates of computer device 102. Alternatively, in the case of a wireless computer device, the GPS coordinates of the base station associated with the wireless computer device may be used. According to some embodiments of the invention, the GPS coordinates may be translated into a physical street address, or other location-identifying data such as a zip code or area code.

The location information may then be used by distance calculation module 204 to calculate the distance to the nearest network resource. Distance calculation module 204 may use any provided location parameter (GPS coordinates, address, zip code, area code) to determine the distance between each network resource and computer device 102 using known mapping/direction finding techniques. According to some embodiments of the invention, network resources 104A-N may be ranked in order of shortest distance from computer device 102.

As noted above, connections module 206 may be provided for managing the connection to one of network resources 104A-N. Based on the calculations performed by distance calculation module 204, connections module 206 may attempt to connect to the closest network resource. According to some embodiments of the invention, connections module 206 may include a mechanism that determines the response time for a preselected number of network resources having the shortest distance from computer device 102. By using the calculated distance and the response time, connection module 206 may connect to the network resource that is both geographically closest and has the shortest response time.

Figure 3:
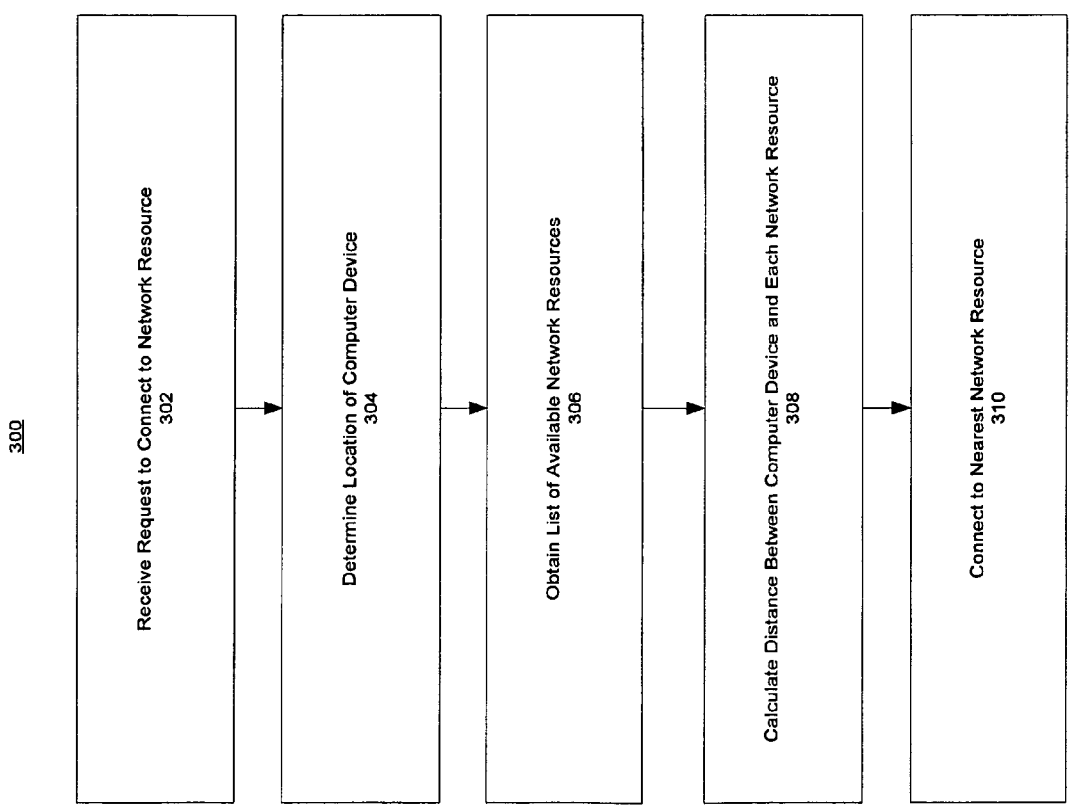
FIG. 3 illustrates a flowchart for determining a nearest network resource, according to various embodiments of the invention.

FIG. 3 illustrates a process 300, configured to determine a nearest network resource, in accordance with various embodiments of the invention. As illustrated at operation 302, a request may be received at computer device 102 from a user to connect computer device 102 to a network in order to obtain data or other information. The data or other information may be located at one or more network resources located in multiple geographic locations. Upon receipt of the request, the computer device 102 may be connected to the nearest network resource in which the required data or other information is located.

As noted above, computer device 102 may be, for example, a mobile device which has the capability of accessing a network from various locations. As illustrated at operation 304 of process 300, the location of computer device 102 may be obtained using location discovery module 202. Location discovery module 202 may send a request to GPS satellite 112 to obtain GPS location coordinates for computer device 102. In some embodiments of the invention, the GPS coordinates may be translated into other location-defining parameters. For example, the GPS coordinates may be translated into a complete street address, a zip code, an area code, and/or other locations defining parameters.

As illustrated at operation 306, a list of network resources may be obtained. According to some embodiments of the invention, the list of network resources may be maintained in database 208, stored at computer device 102. The list of network resources may include, for example, a network resource name, GPS coordinates, a physical address for the network resource, a phone number associated with the network resource's location, and/or other information. According to alternate embodiments of the invention, the list of network resources may also be obtained by querying a dedicated server. According to some embodiments of the invention, computer device 102 may be a wireless device having GPS coordinates of known network resources or access points preprogrammed. It will be appreciated that other methods of determining available network resources may be employed.

Once the location of computer device 102 has been determined and the list of network resources has been obtained, the distance between computer device 102 and each network resource may be calculated, as illustrated at operation 308 of process 300. Distance calculation module 204 may use any provided location parameter to determine distances between computer device 102 and each network resource. For example, if GPS coordinates are used, distance calculation module 302 may determine the difference between the coordinates of computer device 102 and each network resource. If a zip code is used, distance calculation module 308 may determine the distance between the zip codes using any known mapping techniques.

As illustrated at operation 310, computer device 102 may be then connected to the nearest network resource. Connections module 206 may attempt to connect to the network resource having the shortest calculated distance from computer device 102. If the network resource having the shortest calculated distance cannot be reached, connections module 206 may attempt to connect to the network resource having the next shortest distance. This process may be repeated until a connection has been established.

As described above, using both geographic distance and response time to determine an appropriate network resource for connection may result in a stronger connection, such as, for example, a connection that is more stable, uses less bandwidth, has less risk for drop-offs, and/or is otherwise a stronger connection. According to some embodiments of the invention, connections module 206 may also calculate a response time for a predetermined number of network resources having the shortest distance from computer device 102. For example, connection module 206 may perform a ping operation to determine the response time of the three network resources having the shortest distance from computer device 102. Once the response times have been determined for the predetermined number of network resources having the shortest distance, connection module 206 may attempt to connect to the network resource having the shortest response time of the predetermined network resources.

The system and method of the present invention may also be used to discover the location of both fixed and moving resources. For example, a computer device located in a particular office may normally connect to a particular network resource when accessing data. However, if the particular network resource becomes unavailable or service is disrupted, GPS may be used to determine a nearest backup network resource.

Figure 4:
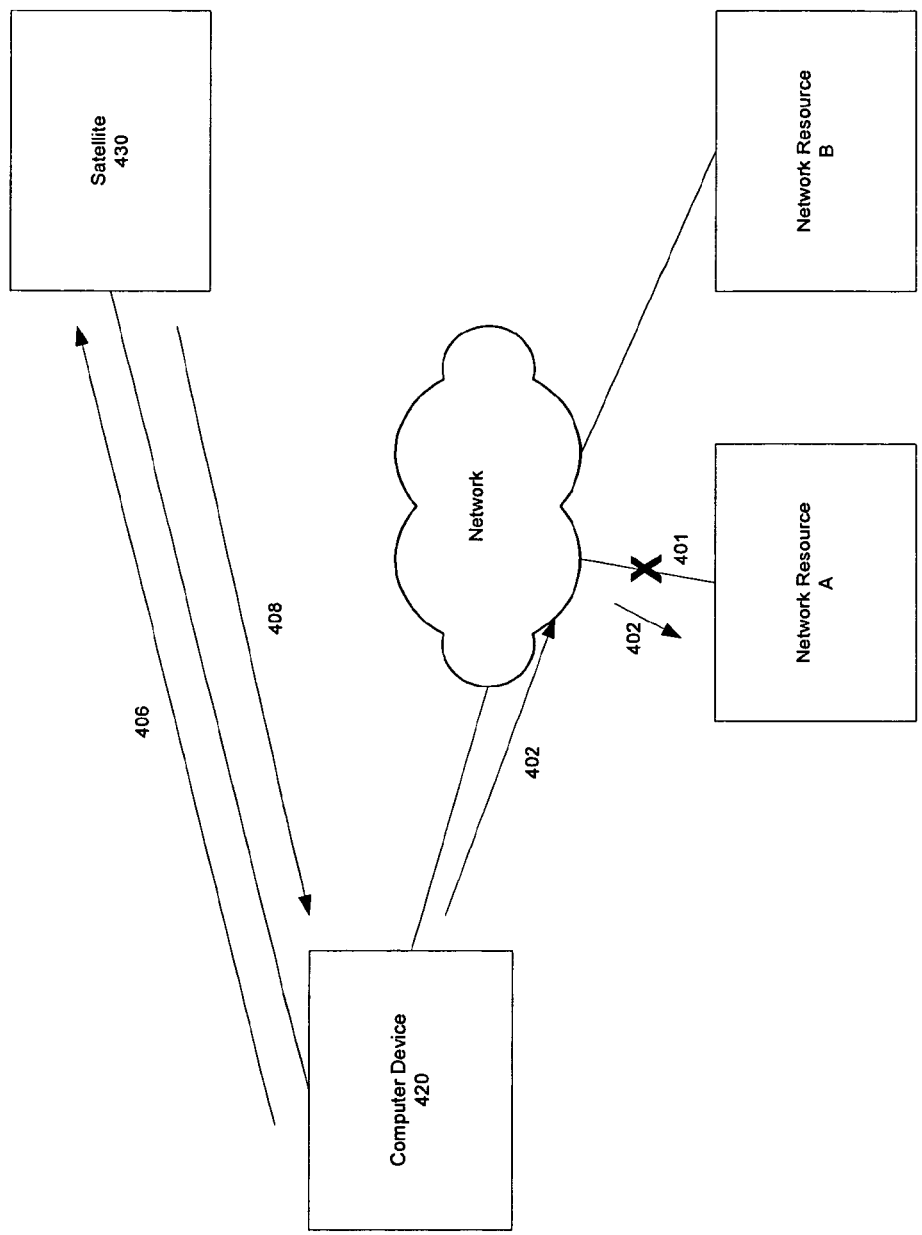
FIG. 4 illustrates a system flow diagram, according to various embodiments of the invention.

FIG. 4 illustrates a system diagram for using GPS to locate a fixed target and calculate a nearest network resource, according to various embodiments of the invention. GPS enabled computer device 420 may normally communicate with Network Resource A to access data by sending a request 402. As indicated by reference numeral 404, the connection between Network Resource A and computer device 420 may become unavailable. For example, Network Resource A may be offline for maintenance, experiencing unusually high connectivity, or otherwise unavailable to computer device 420. When computer device 420 learns that Network Resource A is unavailable, a request 406 may be sent to one or more GPS satellites, such as satellites 430, to determine the location of computer device 420. GPS satellite 430 may respond by providing GPS coordinates, as indicated by reference numeral 408. Operation may then continue in a manner similar to that described above in relation to moving resources. A determination may be made of other network resources containing the desired data, a calculation may be performed to determine the nearest network resource, and a connection may be made to connect to the network resource being the shortest distance from computer device 420.

The techniques of the present invention may be applied in any situation in which a user may choose from a list of available computer resources. For example, files such as software downloads are often mirrored on several FTP sites worldwide. According to various embodiments of the invention, GPS may be used to determine an appropriate FTP site, rather than requiring the user to make a selection. If a user requests to download a file that is mirrored on multiple FTP sites, location discovery module 202 may determine the location of the user device.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for enabling a global positioning system (GPS) enabled computer device comprising a location discovery module, a distance calculation module, and a connections module to locate a nearest network resource for accessing stored data on a network, the network resource comprising a storage device, the method comprising:
   in response to receiving, by the computer device, a user request to access the stored data on the network,
   i) transmitting, by the location discovery module on the computer device, a request to one or more GPS satellites to obtain coordinates indicating a location of the computer device;
   ii) obtaining, at the computer device, a list of one or more network resources via which the requested stored data can be accessed, the one or more network resources configured to send the requested stored data to the computer device;
   iii) calculating, by the distance calculation module on the computer device, for each of the one or more network resources obtained from the list, a distance between the location of the computer device and location of the one or more network resources;
   iv) determining, by the connections module on the computer device, a response time for each network resource in a subset of network resources having a shortest calculated distance to the computer device;
   v) connecting, by the connections module on the computer device, one of the network resources having the shortest calculated distance and a shortest determined response time to the computer device; and
   vi) processing the user request by providing, at the computer device, access to the requested stored data that is sent to the computer device by the connected network resource having the shortest calculated distance and the shortest determined response time.

2. The method of claim 1, further comprising:
   storing the list one or more network resources at the computer device, wherein obtaining the list of one or more network resources comprises retrieving, from the computer device, the stored list of network resources.

3. The method of claim 1, wherein obtaining the list of one or more network resources comprises querying a network resource server, wherein the network resource server maintains a list of network resources.

4. The method of claim 1, wherein the list of one or more network resources includes: i) a name for each of the one or more network resources; ii) one or more of a set of GPS coordinates for each of the one or more network resources; iii) a street address associated with the location of each of the one or more network resources; iv) a zip code associated with a location of each of the one or more network resources; or v) an area code associated with a location of each of the one or more network resources.

5. The method of claim 1, wherein calculating a distance between the location of computer device and the location of the one or more network resources further comprises:
    calculating a difference between GPS coordinates for the one or more network resources, the GPS coordinates obtained from the list of one or more network resources, and the GPS coordinates for the computer device; and
    assigning a distance metric based on the calculated difference wherein a smaller difference indicates a closer network resource.

6. The method of claim 1, wherein the one or more network resources comprises network accessible devices.

7. The method of claim 1, wherein at least one of the one or more network resources comprises a server.

8. The method of claim 1, wherein at least one of the one or more network resources comprises a wireless telephone.

9. The method of claim 1, wherein at least one of the one or more network resources comprises a portable handheld electronic device.

10. The method of claim 1, wherein determining a response time includes performing a ping operation for each network resource in the subset.

11. A system for enabling a global positioning system (GPS) enabled device to determine a nearest network resource for accessing stored data on a network, the network resource comprising a storage device, the system comprising:
    a GPS enabled device configured to receive a user request to access the stored data on the network;
    one or more available network resources via which the requested stored data can be accessed, the one or more available network resources configured to send the requested stored data to the GPS enabled device; and
    the GPS enabled device comprising:
        a location discovery module configured to determine a location of the GPS enabled device;
        a distance calculation module configured to calculate, for each available network resource in a list of the one or more available network resources via which the requested stored data can be accessed, a distance between the location of the GPS enabled device and location of the one or more available network resources; and
        a connections module configured to:
            determine a response time for each available network resource in a subset of available network resources having the shortest calculated distance to the GPS enabled device, and
            connect one of the network resources having the shortest calculated distance and the shortest determined response time to the GPS enabled device,
        wherein the user request is processed by providing, at the GPS enabled device, access to the requested stored data that is sent to the GPS enabled device by the connected network resource having the shortest calculated distance and the shortest determined response time.

12. The system of claim 11, wherein said location discovery module includes a mechanism that retrieves GPS coordinates indicating the location of the GPS enabled device.

13. The system of claim 12, further comprising a mechanism configured to translate said GPS coordinates into one or more of a physical address associated with a location of each available network resource, a zip code associated with a location of each available network resource, and an area code associated with a location of each available network resource.

14. The system of claim 11, wherein said distance calculation module includes a querying mechanism that determines the one or more available network resources.

15. The system of claim 11, wherein the connection module is further configured to determine a response time for each available network resource in a subset of available network resources having the shortest calculated distance to the GPS enabled device by performing a ping operation.

16. The system of claim 11, wherein the location discovery module is further adapted to retrieve, from the GPS enabled device, the list of said one or more available network resources stored at the GPS enabled device.

17. The system of claim 11, wherein said GPS enabled device is a mobile computer device.

18. The system of claim 11, wherein said GPS enabled device is located in a fixed location.

19. The system of claim 11, wherein the one or more available network resources-comprises network accessible devices.

20. The system of claim 11, wherein at least one of the one or more available network resources comprises a personal digital assistant (PDA).

21. The system of claim 11, wherein at least one of the one or more available network resources comprises a wireless telephone.

22. The system of claim 11, wherein at least one of the one or more available network resources comprises a server.

23. A computer device operable with a communication network to determine a nearest network resource for accessing stored data on a network, the computer device configured to receive a user request to access the stored data on the network, the network resource comprising a storage device, the computer device comprising:
    a global-positioning system (GPS) module configured to communicate and interface with a GPS satellite system to determine a location of the computer device;
    a distance calculation module configured to determine, for each available network resource in a list of one or more available network resources via which the requested stored data can be accessed, a distance between the location of the computer device and location of the one or more available network resources, the one or more available network resources configured to send the requested stored data to the computer device; and
    a connections module configured to:
        determine a response time for each available network resource in a subset of available network resources having the shortest calculated distance to the computer device, and
        connect one of the network resources having the shortest calculated distance and the shortest determined response time to the computer device,
    wherein the user request is processed by providing, at the computer device, access to the requested stored data that is sent to the computer device by the connected network resource having the shortest calculated distance and the shortest determined response time.

24. The computer device of claim 23, wherein said GPS module comprises:
    a locating mechanism configured to retrieve GPS coordinates indicating the location of the computer device; and a translating mechanism configured to translate said GPS coordinates into one or more of a physical address associated with a location of each available network resource, a zip code associated with a location of each available network resource, and an area code associated with a location of each available network resource.

* * * * *

UNITED STATES PATENT AND TRADEMARK OFFICE
CERTIFICATE OF CORRECTION

PATENT NO. : 7,643,835 B1 Page 1 of 1
APPLICATION NO. : 11/108754
DATED : January 5, 2010
INVENTOR(S) : Kurt Nosack et al.

It is certified that error appears in the above-identified patent and that said Letters Patent is hereby corrected as shown below:

On the title page:

Related U.S. Application Data should read

Item (63) Continuation-in-part of application No. 11/030,904, filed on Jan. 10, 2005.

Signed and Sealed this

Ninth Day of March, 2010

David J. Kappos
*Director of the United States Patent and Trademark Office*